March 26, 1929.　　　W. R. LITTLE　　　1,707,087

UNION COUPLING

Filed Aug. 27, 1924

WITNESSES

INVENTOR
Wilber R. Little
BY
ATTORNEYS

Patented Mar. 26, 1929.

1,707,087

UNITED STATES PATENT OFFICE.

WILBER R. LITTLE, OF IOWA FALLS, IOWA.

UNION COUPLING.

Application filed August 27, 1924. Serial No. 734,493.

My invention relates to union couplings and it consists in the combinations, constructions and arrangements herein described and claimed.

An object of the invention is to provide a reliable, efficient and durable coupling which can be manufactured at a relatively low cost and which affords facilities for detachably connecting together adjacent ends of pipes so that a fluid tight connection may be provided therebetween without there being any necessity of employing compressible packing between separable coupling members of the device.

Figure 1:
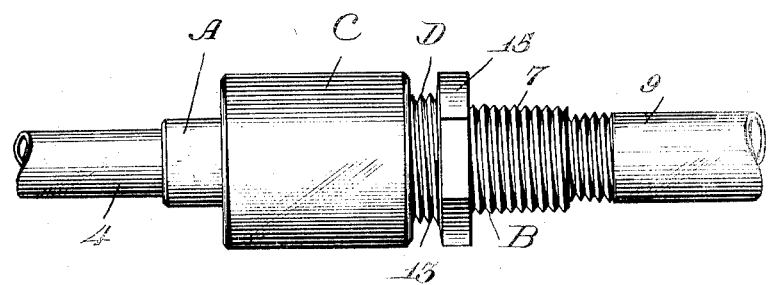
Figure 2:
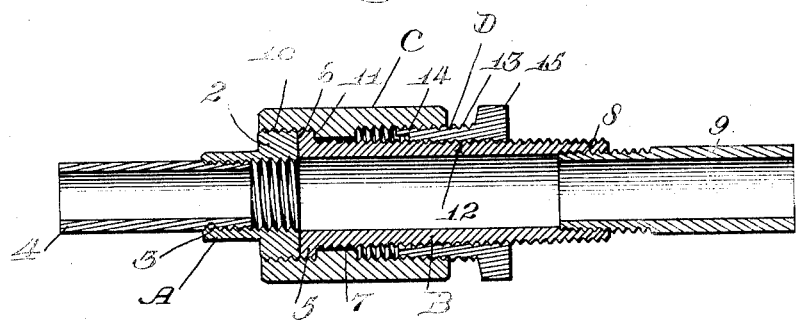

Other objects and advantages will be apparent from the following description, considered in conjunction with the accompanying drawings, in which Figure 1 is a side elevation showing the adjacent ends of two pipes connected by a coupling embodying the invention, Figure 2 is a longitudinal vertical section through the structure which is exhibited in Figure 1.

The union coupling embodying the invention comprises tubular coupling members indicated respectively at A and B. The coupling member A is enlarged externally for part of its length from one of its ends as indicated at 2. The enlarged portion 2 of the coupling member A is provided with tapering screw threads on its outer periphery as indicated at 10. The coupling member A also is provided with internal screw threads which extend longitudinally of the coupling member A from the outer end of the smaller portion thereof as indicated at 3, for any desirable part of the length of the coupling member A and are adapted to engage with screw threads on the end of length of pipe 4.

The coupling member B is shown as being of greater length than the coupling member A and is provided at one end with an external annular enlargement 5 which may be provided with tapering external screw threads as at 6, the diameter of the outer end of the portion 5 of the coupling member B being equal to the diameter of the outer end of the enlarged portion 2 of the coupling member A and the diameter of the portion 5 of the coupling member B then decreasing slightly toward its inner end. The coupling member B is provided with tapering external screw threads 7 extending from the inner end of the enlarged end portion 5 toward the opposite end of the coupling member B and the end portion of the coupling member B which is opposite that enlarged as hereinbefore described is provided with internal screw threads 8 for engaging with external screw threads on the end portion of a length of pipe 9.

A sleeve nut C is adapted to be slid loosely along the diametrically smaller portion of the coupling member B until the tapering internal screw threads of a socket 10 in one end of the sleeve nut engage with the external threads on the enlarged portions 5 and 2 of the coupling members B and A respectively, it being understood that the enlarged portions 5 and 2 are placed in end to end contiguous relation before the sleeve nut C is slid along the coupling member B until the externally threaded enlargements 5 and 2 of the coupling members B and A enter the socket 10 and engage with the threads of the latter. The socket 10 preferably has a length approximately equal to the combined length of the enlarged portions 5 and 2 of the coupling members B and A but extends for only part of the length of the sleeve nut C, an annular shoulder 11 thus being formed at the inner end of the socket 10. It therefore will be manifest that when the sleeve nut C is turned on the aligned enlarged portions 5 and 2 of the coupling members B and A in one direction, the enlarged portions of such coupling members will be drawn into the socket 10 until the enlarged end portion 5 of the coupling member B is clamped tightly against the shoulder 11 and the enlarged portion 2 of the coupling member A is clamped against the enlarged end portion 5 and a fluid tight joint thus is produced between the engaging ends of the enlarged portions 5 and 2 of the coupling members and between the coupling members and the sleeve nut C. When the sleeve nut C is turned in the opposite direction on the enlarged end portions 5 and 2 of the coupling members, the sleeve nut will move rearwardly along the coupling member B until the enlarged portion 2 of the coupling member A is no longer in threaded engagement with the socket 10 and the coupling members A and B then can be separated.

The sleeve nut C may be held against retrograde movement on the coupling member B from position to clamp the enlarged portions 5 and 2 of the coupling members in fluid tight contact with each other by a locking member D which is shown as being a bushing having tapering internal threads 12 for engaging with the threads 7 on the diametrically smaller portion of the coupling member B and tapering external threads extending from one end of the bushing for part of its length as indicated at 13 for engaging with the tapering threads of a socket 14 in the adjacent end of the sleeve nut 3. The locking member D is provided at its outer end with an external annular enlargement 15 which has facets placed on its end as shown in Figure 1 so that it is adapted to be engaged by a spanner wrench or like tool and turned on the externally threaded diametrically smaller portion of the coupling member B to and from position to clamp the sleeve nut C against retrograde movement from the position shown in Figure 2.

From the foregoing description of the various parts of the device, the operation thereof may be readily understood. The device can be used to connect pipes such as indicated at 4 and 9 respectively in the drawings so that a fluid tight connection is had between such pipes without the use of any compressible packing and therefore the device is not likely to have the efficiency thereof impaired in service and is adapted to connect pipes for conducting fluids which are injurious to the usual gaskets or packing which are employed in union couplings of ordinary construction. The device is not likely to get out of order easily and the relatively movable parts thereof can be adjusted conveniently and easily to connect adjacent ends of pipes so that a fluid tight joint is provided between such pipes or to permit the pipes to be disconnected from each other.

Obviously, my invention is susceptible of embodiment in forms other than that illustrated in the accompanying drawing and I therefore consider as my own all such modifications and adaptations of the form of the device herein described as fairly fall within the scope of the appended claim.

I claim:—

A union coupling comprising two tubular coupling members having abutting plane ends, said ends having exterior enlarged annular portions, and adapted at their remote ends for connection with adjacent ends of service pipes, the enlarged end of the first coupling member externally threaded, and the second coupling member having an externally threaded diametrically smaller portion extending from its enlarged portion to its remote end, a sleeve nut having an internally threaded portion, another portion of said sleeve having a smooth bore of smaller diameter than the threaded portion defining an internal shoulder adapted to abut the enlarged portion of the second coupling member and engage the threaded enlarged portion of the first member, and freely slidable along the diametrically smaller portion of the second member, said sleeve having a threaded socket in one end of a depth substantially equal to the combined thickness of the enlarged annular portions of the first and second members to coact with the threads of the annular enlargement of the first member to force the members together and draw them within the socket and against the annular internal shoulder, said sleeve having a tapering socket at its other end, a locking bushing having a tapering externally threaded extension adapted to engage in said tapering socket of the sleeve, and a uniform internally threaded portion to engage the externally threaded diametrically smaller portion of the second member to lock the sleeve against retrograde movement of both said coupling members, said bushing having an enlarged outer end adapted to be engaged by a wrench for manipulation.

WILBER R. LITTLE.